July 31, 1923.

A. E. HENDERSON 1,463,529

DEVICE FOR THE MANUFACTURE OF PNEUMATIC TUBES

Filed Jan. 27, 1917

Witnesses

Inventor

Albert Ennis Henderson

Patented July 31, 1923.

1,463,529

UNITED STATES PATENT OFFICE.

ALBERT ENNIS HENDERSON, OF TORONTO, ONTARIO, CANADA.

DEVICE FOR THE MANUFACTURE OF PNEUMATIC TUBES.

Application filed January 27, 1917. Serial No. 144,910.

*To all whom it may concern:*

Be it known that I, ALBERT ENNIS HENDERSON, a subject of the King of Great Britain, residing in Toronto, Province of Ontario, in the Dominion of Canada, have invented new and useful Improvements in Devices for the Manufacture of Pneumatic Tubes, of which the following is a specification.

My invention relates to improvements in devices for the manufacture of inner tubes in which the tube is provided with protecting means in that portion of the tube adjacent to the rim of the wheel.

In my co-pending application filed December 26, 1916, No. 139,007 I have shown means for the insertion of protecting fabric arranged in strips longitudinally around the rim side of the tube overlapping longitudinally and transversely.

The objects of my present improvements are:—

First. To provide a device by means of which strips may be uniformly imbedded in the rim side of the tube in diagonal formation.

Second. To provide a device whereby the fabric may be imbedded uniformly in the rubber of the tube.

Third. To provide a means whereby the protecting fabric may be imbedded uniformly throughout the entire length of the rim side of the tube when the same is joined together.

I attain these objects by the mechanism illustrated in the accompanying drawings.

Similar reference characters refer to similar parts throughout the several views.

Figure 1:
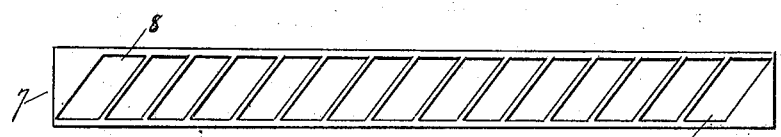
Fig. 1 is a plan view showing the templet provided with diagonal slots to receive the fabric.
Figure 2:
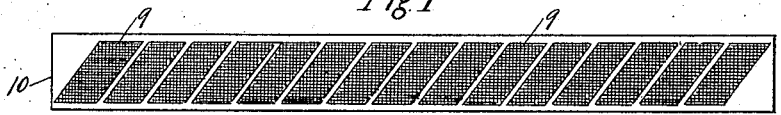
Fig. 2 is a plan view of a strip of rubber co-extensive with the templet shown in Fig. 1, having the fabric strips applied uniformly and diagonally to one side of the strip through the slots of the templet.

In Fig. 1, I have shown the templet 7 having the slots 8 adapted to receive the fabric strips 9 so as to position them uniformly on the strip of rubber 10 shown in Fig. 2.

In Fig. 2 is shown the strip of rubber 10 with the fabric strips 9 in place adhering to the surface thereof. The strip of rubber 10 being turned over, as shown in Fig. 3, the templet 7 being placed evenly upon the strip of rubber 10 provides a guide for the insertion of the fabric strips $9^A$ which are inserted through the openings as in the case of the strips 9 in Fig. 2.

Figure 3:
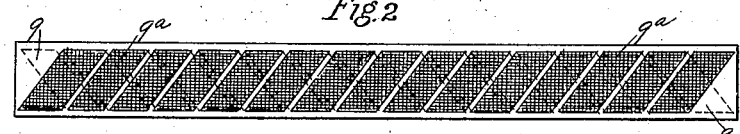
Fig. 3 shows the reverse side of the strip shown in Fig. 2, having the oppositely disposed strips of fabric applied thereto.

In Fig. 3 the fabric strips 9 are shown in dotted formation oppositely disposed to the strips $9^A$.

Figure 4:
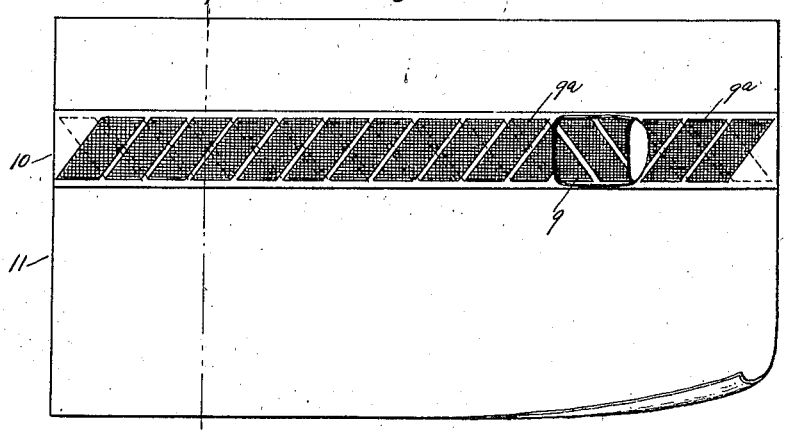
Fig. 4 is a plan view of a sheet of rubber with the strip shown in Figs. 2 and 3 positioned on the surface of the same so as to provide for uniform imbedding of the fabric in the rubber of the tube.

In Fig. 4 I have shown the sheet of rubber 11, being the usual amount of rubber required for the formation of a tube. Positioned on the surface of the sheet 11 is the strip of rubber 10 having the oppositely disposed series 9 and $9^A$ of fabric strips positioned thereon in uniform relation to each other throughout the length of the tube, the position of the said strip 10 being such that as the tube is rolled into form the rubber of the tube, including that portion radially between the series of strips 9 and $9^A$ will be uniformly distributed around the transverse circumference of the tube so that the only additional material required in the tube will be the series of fabric strips 9 and $9^A$.

Figure 5:
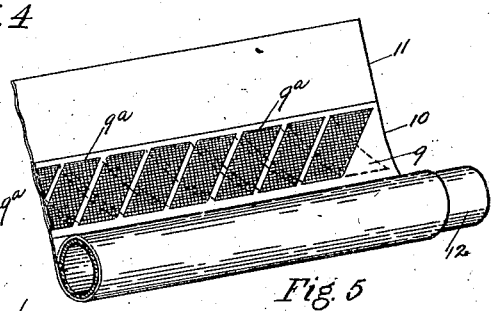
Fig. 5 shows a portion of the sheet of rubber with the fabric attached in process of being formed into a tube.

In Fig. 5 I have shown a portion of the sheet of rubber 11 with the strip of rubber 10 having in proper position thereon the series of fabric strips 9 and $9^A$, the said sheet being formed into a tube on the pole 12, preparatory to being wrapped for vulcanization.

Figure 6:
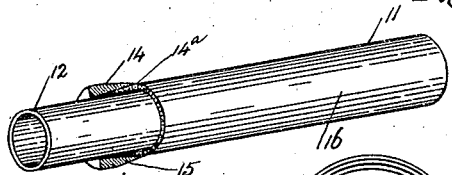
Fig. 6 shows a portion of the tube completely rolled up on the pole with the fabric imbedded in proper position and with a clamp in place on the end.

In Fig. 6 I show a portion of the sheet 11 completely rolled upon the pole 12, and carrying the retaining clamp 14, provided with the internal taper portion $14^A$, which is adapted to properly taper the end portion 15 of the tube 16, so as to form the ends of the tube for being suitably joined together.

Figure 7:
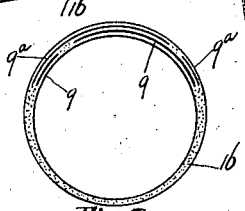
Fig. 7 shows a cross sectional view of the tube showing the position of the fabric in the rim side of the tube in the line 7—7 of Fig. 4.

In Fig. 7 I have shown in cross section a portion of the tube in the line 7—7 of Fig. 4 after the same has been removed from the pole and reversed, in which the relative positions of the diagonal strips 9 and 9$^A$ are shown in transverse section.

From the drawings and specifications as above set forth it will be seen that I have provided a means whereby the fabric may be inserted diagonally varying in details from my co-pending application and of such a character that the fabric will be uniformly distributed longitudinally around the rim side of the tube in such manner as to permit of longitudinal, transverse and diagonal expansion, at the same time providing a protection for the rim side of the tube against pinches, either by the casing or through carelessness of the operator. I have also shown means which will insure the uniform distribution of the protecting means longitudinally around the rim side of the tube at the junction of the ends as well as throughout the tube. I have also shown means whereby the tube is adapted to be joined without departing from the uniform size of the body of the tube.

I do not confine myself to the construction shown in the drawings and described in the specifications, as modifications may be made in the same without departing from the spirit of my invention.

I claim:

1. A device of the character described comprising a template provided with diagonal slots adapted to position fabric strips in oppositely disposed formation within the body of the tube.

2. A device of the character described comprising a template provided with parallel diagonal slots for positioning fabric strips in oppositely disposed formation within the body of a tire tube substantially as set forth.

In testimony whereof I have hereunto affixed my signature in the presence of two witnesses.

ALBERT ENNIS HENDERSON.

Witnesses:
I. L. ATKINSON,
HUBERT G. PAULL.